United States Patent
Koo et al.

(10) Patent No.: US 10,521,138 B2
(45) Date of Patent: Dec. 31, 2019

(54) MEMORY SYSTEM AND OPERATING METHOD FOR RE-BUILDING MAP DATA ACCORDING TO OPERATION LOGS

(71) Applicant: SK hynix Inc., Gyeonggi-do (KR)

(72) Inventors: Duck-Hoi Koo, Gyeonggi-do (KR); Yong-Tae Kim, Gyeonggi-do (KR); Soong-Sun Shin, Gyeonggi-do (KR); Cheon-Ok Jeong, Gyeonggi-do (KR)

(73) Assignee: SK hynix Inc., Gyeonggi-do (KR)

(*) Notice: Subject to any disclaimer, the term of this patent is extended or adjusted under 35 U.S.C. 154(b) by 149 days.

(21) Appl. No.: 15/837,482

(22) Filed: Dec. 11, 2017

(65) Prior Publication Data

US 2018/0349045 A1    Dec. 6, 2018

(30) Foreign Application Priority Data

May 30, 2017   (KR) .................. 10-2017-0066696

(51) Int. Cl.
*G06F 12/00*    (2006.01)
*G06F 3/06*    (2006.01)
*G06F 12/121*    (2016.01)
*G06F 11/07*    (2006.01)

(52) U.S. Cl.
CPC ............ *G06F 3/0619* (2013.01); *G06F 3/064* (2013.01); *G06F 3/065* (2013.01); *G06F 3/068* (2013.01); *G06F 3/0632* (2013.01); *G06F 3/0679* (2013.01); *G06F 11/07* (2013.01); *G06F 12/121* (2013.01)

(58) Field of Classification Search
CPC ...... G06F 3/0619; G06F 3/0632; G06F 11/07; G06F 3/065; G06F 3/068; G06F 12/121; G06F 3/0679; G06F 3/064

USPC .......................................................... 711/159
See application file for complete search history.

(56) References Cited

U.S. PATENT DOCUMENTS

| | | | |
|---|---|---|---|
| 9,170,932 B1* | 10/2015 | Lo ................. | G06F 12/0246 |
| 2009/0132760 A1* | 5/2009 | Flynn ............... | G06F 3/0613 |
| | | | 711/113 |
| 2014/0059275 A1* | 2/2014 | Yun ................. | G06F 12/0246 |
| | | | 711/103 |
| 2014/0136753 A1* | 5/2014 | Tomlin ............ | G06F 12/0246 |
| | | | 711/103 |
| 2015/0138884 A1* | 5/2015 | Park ................. | G06F 13/16 |
| | | | 365/185.08 |
| 2016/0283308 A1 | 9/2016 | Earhart | |

FOREIGN PATENT DOCUMENTS

KR    1020110125611    11/2011

\* cited by examiner

*Primary Examiner* — Mardochee Chery
(74) *Attorney, Agent, or Firm* — IP & T Group LLP

(57) ABSTRACT

A memory system including a nonvolatile memory device storing operation logs and map data; a volatile memory for temporarily storing the map data; and a controller flushing the map data from the volatile memory into the nonvolatile memory device by units of map data groups, and rebuilding the map data by selectively reading the map data by the units of map data groups from the nonvolatile memory device into the volatile memory according to the operation logs, wherein the operation logs indicate: locations of first and last pages to store the flushed map data; a start of an error management operation to a program error during the flushing of the map data; and a location of a last page storing normally flushed map data before an occurrence of the program error.

21 Claims, 10 Drawing Sheets

MEMORY SYSTEM AND OPERATING METHOD FOR RE-BUILDING MAP DATA ACCORDING TO OPERATION LOGS

CROSS-REFERENCE TO RELATED APPLICATIONS

The present application claims priority under 35 U.S.C. § (a) to Korean Patent Application No. 10-2017-0066696 filed on May 30, 2017, the disclosure of which is incorporated herein by reference in its entirety.

BACKGROUND

1. Field

Various exemplary embodiments of the present invention relate to a multi-processor system and, more particularly, to a controller capable of efficiently managing data, and an operating method thereof.

2. Description of the Related Art

The computer environment paradigm has changed to ubiquitous computing systems that can be used anytime and anywhere. That is, use of portable electronic devices such as mobile phones, digital cameras, and notebook computers has rapidly increased. These portable electronic devices generally use a memory system having one or more memory devices for storing data. A memory system may be used as a main memory device or an auxiliary memory device of a portable electronic device.

Memory systems provide excellent stability, durability, high information access speed, and low power consumption because they have no moving parts. Examples of memory systems having such advantages include universal serial bus (USB) memory devices, memory cards having various interfaces, and solid state drives (SSD).

A plurality of processors may be employed in a controller for a memory system for improving the overall speed of the controller. The processors may have different roles, and may collaborate to support the entire system by exchanging data with each other, a technique known as inter-processor communication (IPC).

A data storage device is provided power from a power supplied device. And due to the sudden power off (SPO) of the power supplied device, the data storage device may be seriously damaged. For example, metadata or cache data must be safely protected in a flash memory based SSD storage devices, but data may be lost due to SPO. In order to solve such a problem, a method of sudden power off recovery (SPOR) to recover a data storage device from power-off of a power supply has been studied.

SUMMARY

Various embodiments of the present invention are directed to a memory system capable of flushing map data in order and operating method thereof.

In accordance with an embodiment of the present invention, An operating method of memory system including a controller having a memory for storing map data and a memory device having a meta region and a user data region, may include a first step of storing, by the controller, a plurality of operation logs of the controller into a first meta region of the memory device; and a second step of dividing, by the controller, the map data stored in the memory into a plurality of meta data groups each having a predetermined size, and flushing, by the controller, the plurality of meta data groups, into a second meta region of the memory device, wherein the plurality of operation logs include first to sixth operation logs, and wherein the first operation log indicates a start of a flush operation to a map data group as a target of the flush operation among the plurality of map data groups; the second operation log indicates an end of the flush operation to the map data group as the target of the flush operation; the third operation log indicates a location of a first page to store flushed map data in the memory device; the fourth operation log indicates a location of a last page to store flushed map data in the memory device; the fifth operation log indicates a start of an error management operation to a program error during an operation of programming map data into the second meta region of the memory device; and the sixth operation log indicates a location of a last page storing normally flushed map data before an occurrence of the program error.

The second step may be performed by dividing a whole of the map data into the plurality of map data having a size of a segment and by flushing the plurality of map data groups.

The first step may be performed by storing, when the controller begins the flush operation, the first operation log and the third operation log into the first meta region of the memory device.

When there occurs the program error while the controller is flushing the map data, the second step may include a third step of storing the fifth operation log and the sixth operation log into the first meta region of the memory device; and a fourth step of sequentially re-flushing the map data stored in from a page, in which the program error occurs, to a page, which is last flushed, into a page of the second meta region next to the page, which is last flushed.

A fifth step of storing, by the controller, may further include the second operation log and the fourth operation log into the first meta region of the memory device after completion of flushing one map data group.

A reading, by the controller, may further include the map data in reverse order from a page, which is last flushed in the memory device, and loading, by the controller, the read map data to the memory when there occurs a sudden power off (SPO).

The controller may read the previous page of page which is last flushed in the memory device.

The controller may read the chap data according to the operation logs stored in the first meta region.

In accordance with an embodiment of the present invention, a controller may include a memory suitable for storing map data, wherein the controller stores a plurality of operation logs thereof in a first meta region of a memory device, divides the map data into a plurality of meta data groups each having a predetermined size, and flushes the plurality of meta data groups, into a second meta region of the memory device, wherein the plurality of operation logs include first to sixth operation logs, and wherein the first operation log indicates a start of a flush operation to a map data group as a target of the flush operation among the plurality of map data groups; the second operation log indicates an end of the flush operation to the map data group as the target of the flush operation; the third operation log indicates a location of a first page to store flushed map data in the memory device; the fourth operation log indicates a location of a last page to store flushed map data in the memory device, the fifth operation log indicates a start of an error management operation to a program error during an operation of programming map data into the second meta region of the memory device; and the sixth operation log indicates a location of a last page storing normally flushed map data before an occurrence of the program error.

The controller may divide a whole of the map data into the plurality of map data having a size of a segment and flushes the plurality of map data groups.

The controller stores, when the controller begins the flush operation, the first operation log and the third operation log into the first meta region of the memory device.

When there occurs the program error while the controller is flushing the map data, the controller may further store the fifth operation log and the sixth operation log into the first meta region of the memory device; and sequentially re-flush the map data stored in from a page, in which the program error occurs, to a page, which is last flushed, into a page of the second meta region next to the page, which is last flushed.

The controller may further store the second operation log and the fourth operation log into the first meta region of the memory device after completion of flushing one map data group.

The controller may further read the map data in reverse order from a page, which is last flushed in the memory device, and loads the read map data to the memory when there occurs a sudden power off (SPO).

The controller may read the previous page of page, which is last flushed in the memory device.

The controller reads the map data according to the operation logs stored in the first meta region.

In accordance with an embodiment of the present invention. A memory system may include a controller including a memory suitable for storing map data; and a memory device including meta region and a user data region, wherein the controller stores a plurality of operation logs thereof in a first meta region of a memory device, divides the map data into a plurality of meta data groups each having a predetermined size, and flushes the plurality of meta data groups, into a second meta region of the memory device, wherein the plurality of operation logs include first to sixth operation logs, and wherein the first operation log indicates a start of a flush operation to a map data group as a target of the flush operation among the plurality of map data groups; the second operation log indicates an end of the flush operation to the map data group as the target of the flush operation; the third operation log indicates a location of a first page to store flushed map data in the memory device; the fourth operation log indicates a location of a last page to store flushed map data in the memory device; the fifth operation log indicates a start of an error management operation to a program error during an operation of programming map data into the second meta region of the memory device; and the sixth operation log indicates a location of a last page storing normally flushed map data before an occurrence of the program error.

The controller may store, when the controller begins the flush operation, the first operation log and the third operation log into the first meta region of the memory device.

when there occurs the program error while the controller is flushing the map data, the controller may further store the fifth operation log and the sixth operation log into the first meta region of the memory device; sequentially re-flush the map data stored in from a page in which the program error occurs, to a page, which is last flushed, into a page of the second meta region next to the page, which is last flushed; and store the second operation log and the fourth operation log into the first meta region of the memory device after completion of flushing one map data group divided to have a size of a segment.

The controller may further read the map data in reverse order from a page, which is last flushed in the memory device, and load the read map data to the memory when there occurs a sudden power off (SPO).

In accordance with an embodiment of the present invention. A memory system may include a nonvolatile memory device suitable for storing operation logs and map data; a volatile memory suitable for temporarily storing the map data; and a controller suitable for flushing the map data from the volatile memory into the nonvolatile memory device by units of map data groups; and rebuilding the map data by selectively reading the map data by units of map data groups from the nonvolatile memory device into the volatile memory according to the operation logs, wherein the operation logs indicate locations of first and last pages to store flushed map data; a start of an error management operation to a program error during the flushing of the map data; and a location of a last page storing normally flushed map data before an occurrence of the program error.

DETAILED DESCRIPTION

Figure 1:
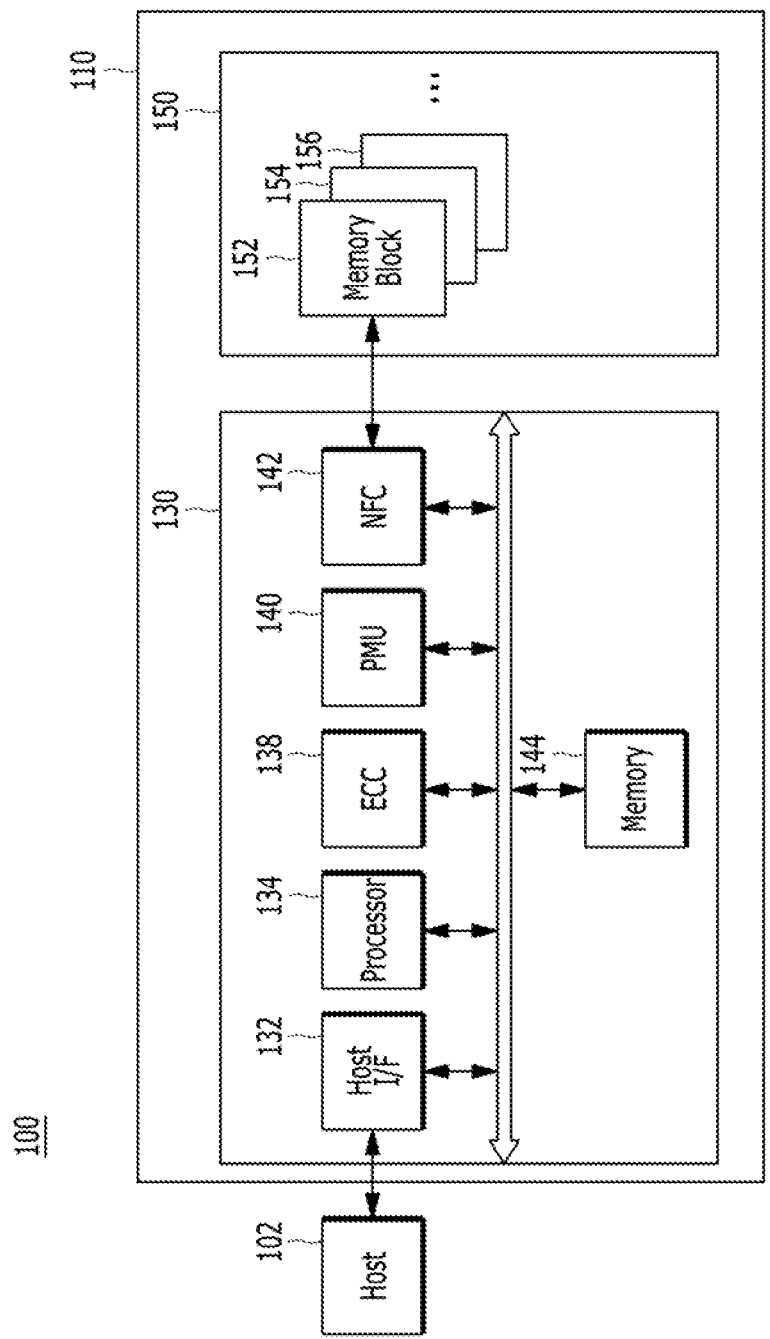
FIG. 1 is a block diagram illustrating a data processing system including a memory system, in accordance with an embodiment of the present invention.

Various embodiments of the present invention are described below in more detail with reference to the accompanying drawings. We note, however, that the present invention may be embodied in different other embodiments, forms and variations thereof and should not be construed as being limited to the embodiments set forth herein. Rather, the described embodiments are provided so that this disclosure will be thorough and complete, and will fully convey the present invention to those skilled in the art to which this invention pertains. Throughout the disclosure, like reference numerals refer to like parts throughout the various figures and embodiments of the present invention.

It will be understood that, although the terms "first", "second", "third", and so on may be used herein to describe various elements, these elements are not limited by these terms. These terms are used to distinguish one element from another element. Thus, a first element described below could also be termed as a second or third element without departing from the spirit and scope of the present invention.

The drawings are not necessarily to scale and, in some instances, proportions may have been exaggerated in order to clearly illustrate features of the embodiments. When an element is referred to as being connected or coupled to another element, it should be understood that the former can be directly connected or coupled to the latter, or electrically connected or coupled to the latter via an intervening element therebetween.

It will be further understood that when an element is referred to as being "connected to", or "coupled to" another element, it may be directly on, connected to, or coupled to the other element, or one or more intervening elements may be present. In addition, it will also be understood that when an element is referred to as being "between" two elements, it may be the only element between the two elements, or one or more intervening elements may also be present.

The terminology used herein is for the purpose of describing particular embodiments only and is not intended to be limiting of the present invention.

As used herein, singular forms are intended to include the plural forms as well, unless the context clearly indicates otherwise.

It will be further understood that the terms "comprises", "comprising", "includes," and "including" when used in this specification, specify the presence of the stated elements and do not preclude the presence or addition of one or more other elements. As used herein, the term "and/or" includes any and all combinations of one or more of the associated listed items.

Unless otherwise defined, all terms including technical and scientific terms used herein have the same meaning as commonly understood by one of ordinary skill in the art to which the present invention belongs in view of the present disclosure. It will be further understood that terms, such as those defined in commonly used dictionaries, should be interpreted as having a meaning that is consistent with their meaning in the context of the present disclosure and the relevant art and will not be interpreted in an idealized or overly formal sense unless expressly so defined herein.

In the following description, numerous specific details are set forth in order to provide a thorough understanding of the present invention. The present invention may be practiced without some or all of these specific details. In other instances, well-known process structures and/or processes have not been described in detail in order not to unnecessarily obscure the present invention.

It is also noted, that in some instances, as would be apparent to those skilled in the relevant art, a feature or element described in connection with one embodiment may be used singly or in combination with other features or elements of another embodiment, unless otherwise specifically indicated.

FIG. 1 is a block diagram illustrating a data processing system 100 in accordance with an embodiment of the present invention.

Referring to FIG. 1, the data processing system 100 may include a host 102 operatively coupled to a memory system 110.

The host 102 may include, for example, a portable electronic device such as a mobile phone, an MP3 player and a laptop computer or an electronic device such as a desktop computer, a game player, a TV, a projector and the like.

The memory system 110 may operate in response to a request from the host 102, and in particular, store data to be accessed by the host 102. The memory system 110 may be used as a main memory system or an auxiliary memory system of the host 102. The memory system 110 may be implemented with any one of various types of storage devices, which may be electrically coupled with the host 102, according to a protocol of a host interface. Examples of suitable storage devices include a solid state drive (SSD), a multimedia card (MMC), an embedded MMC (eMMC), a reduced size MMC (RS-MMC) and a micro-MMC, a secure digital (SD) card, a mini-SD and a micro-SD, a universal serial bus (USB) storage device, a universal flash storage (UFS) device, a compact flash (CF) card, a smart media (SM) card, a memory stick, and the like.

The storage devices for the memory system 110 may be implemented with a volatile memory device such as a dynamic random access memory (DRAM) and a static RAM (SRAM) and nonvolatile memory device such as a read only memory (ROM) a mask ROM (MROM), a programmable ROM (PROM), an erasable programmable ROM (EPROM), an electrically erasable programmable ROM (EEPROM), a ferroelectric RAM (FRAM), a phase-change RAM (PRAM), a magneto-resistive RAM (MRAM), resistive RAM (RRAM) and a flash memory.

The memory system 110 may include a memory device 150 which stores data to be accessed by the host 102 and a controller 130 which may control storage of data in the memory device 150.

The controller 130 and the memory device 150 may be integrated into a single semiconductor device, which may be included in the various types of memory systems as exemplified above.

The memory system 110 may be configured as part of a computer, an ultra-mobile PC (UMPC), a workstation, a net-book, a personal digital assistant (PDA), a portable computer, a web tablet, a tablet computer, a wireless phone, a mobile phone, a smart phone, an e-book, a portable multimedia player (PMP), a portable game player, a navigation system, a black box, a digital camera, a digital multimedia broadcasting (DMB) player, a 3D television, a smart television, a digital audio recorder, a digital audio player, a digital picture recorder, a digital picture player, a digital video recorder, a digital video player, a storage configuring a data center, a device capable of transmitting and receiving information under a wireless environment, one of various electronic devices configuring a home network, one of various electronic devices configuring a computer network, one of various electronic devices configuring a telematics network, a radio frequency identification (RFID) device, or one of various component elements configuring a computing system.

The memory device 150 may be a nonvolatile memory device and may retain data stored therein even though power is not supplied. The memory device 150 may store data provided from the host 102 through a write operation, and provide data stored therein to the host 102 through a read operation. The memory device 150 may include a plurality of memory blocks 152 to 156, each of the memory blocks 152 to 156 may include a plurality of pages. Each of the pages may include a plurality of memory cells to which a plurality of word lines (WL) are electrically coupled.

The controller 130 may control overall operations of the memory device 150, such as read, write, program and erase operations. For example, the controller 130 of the memory system 110 may control the memory device 150 in response to a request from the host 102. The controller 130 may provide the data read from the memory device 150, to the host 102, and/or may store the data provided from the host 102 into the memory device 150.

The controller 130 may include a host interface (I/F) unit 132, a processor 134, an error correction code (ECC) unit 138, a power management unit (PMU) 140, a memory device controller 142 such as a NAND flash controller (NFC) 142 and a memory 144 all operatively coupled via an internal bus.

The host interface unit 132 may process commands and data provided from the host 102, and may communicate with the host 102 through at least one of various interface protocols such as universal serial bus (USB), multimedia card (MMC), peripheral component interconnect-express (PCI-E), small computer system interface (SCSI), serial-attached SCSI (SAS), serial advanced technology attachment (SATA), parallel advanced technology attachment (PATH), small computer system interface (SCSI), enhanced small disk interface (ESDI) and integrated drive electronics (IDE).

The ECC unit 138 may detect and correct errors in the data read from the memory device 150 during the read operation. The ECC unit 138 may not correct error bits when the number of the error bits is greater than or equal to a threshold number of correctable error bits, and may output an error correction fail signal indicating failure in correcting the error bits.

The ECC unit 138 may perform an error correction operation based on a coded modulation such as a low density parity check (LDPC) code, a Bose-Chaudhuri-Hocquenghem (BCH) code, a turbo code, a Reed-Solomon (RS) code, a convolution code, a recursive systematic code (RSC), a trellis-coded modulation (TCM), a Block coded modulation (BCM) and so on. The ECC unit 138 may include all circuits, modules, systems or devices for the error correction operation.

The PMU 140 may provide and manage power of the controller 130.

The NEC 142 may serve as a memory/storage interface between the controller 130 and the memory device 150 to allow the controller 130 to control the memory device 150 in response to a request from the host 102. The NEC 142 may generate a control signal for the memory device 150 and process data to be provided to the memory device 150 under the control of the processor 134 when the memory device 150 is a flash memory and, in particular, when the memory device 150 is a NAND flash memory.

The memory 144 may serve as a working memory of the memory system 110 and the controller 130, and store data for driving the memory system 110 and the controller 130. The controller 130 may control the memory device 150 in response to a request from the host 102. The controller 130 may provide data read from the memory device 150 to the host 102, may store data provided from the host 102 into the memory device 150. The memory 144 may store data required for the controller 130 and the memory device 150 to perform these operations.

Figure 5:
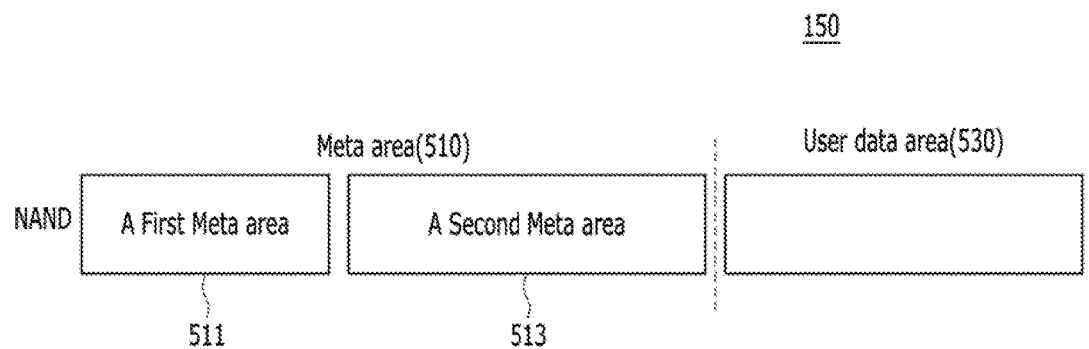
FIG. 5 is a block diagram illustrating the memory device in accordance with an embodiment of the present invention.

The memory 144 may include a mailbox for storing data for communication between a plurality of processors (See FIG. 5).

The memory 144 may be implemented with, a volatile memory.

The memory 144 may be implemented with a static random access memory (SRAM) or a dynamic random access memory (DRAM). The memory 144 may be disposed within or out of the controller 130. FIG. 1 exemplifies the memory 144 disposed within the controller 130. In an embodiment, the memory 144 may be embodied by an external volatile memory having a memory interface transferring data between the memory 144 and the controller 130.

The processor 134 may control the overall operations of the memory system 110. The processor 134 may drive firmware, which is referred to as a flash translation layer (FTL), to control the general operations of the memory system 110.

A FTL may perform an operation as an interface between the host 102 and the memory device 150. The host 102 may request to the memory device 150 write and read operations through the FTL.

The FTL may manage operations of address mapping, garbage collection, wear-leveling and so forth. Particularly, the FTL may store map data. Therefore, the controller 130 may map a logical address, which is provided from the host 102, to a physical address of the memory device 150 through the map data. The memory device 150 may perform an operation like a general device because of the address mapping operation. Also, through the address mapping operation based on the map data, when the controller 130 updates data of a particular page, the controller 130 may program new data into another empty page and may invalidate old data of the particular page due to a characteristic of a flash memory device. Further, the controller 130 may store map data of the new data into the FTL.

Further, the FIT may re-build the map data during the sudden power off recovery (SPQR) operation. The SPOR operation may be performed during a booting operation at least after an abnormal power off. In accordance with an embodiment of the present invention, an operating method of a memory system may re-build a map data during a booting after an abnormal power off.

The processor 134 may be implemented with a microprocessor or a central processing unit (CPU). The memory system 110 may include one or more processors 134.

A management unit (not shown) may be included in the processor 134, and may perform bad block management of the memory device 150. The management unit may find bad memory blocks included in the memory device 150, which are in unsatisfactory condition for further use, and perform bad block management on the bad memory blocks. When the memory device 150 is a flash memory, for example, a NAND flash memory, a program failure may occur during the write operation, for example, during the program operation, due to characteristics of a NAND logic function. During the bad block management, the data of the program-failed memory block or the bad memory block may be programmed into a new memory block. Also, the bad blocks due to the program fail seriously deteriorates the utilization efficiency of the memory device 150 having a 3D stack structure and the reliability of the memory system 100, and thus reliable bad block management is required.

Figure 2:
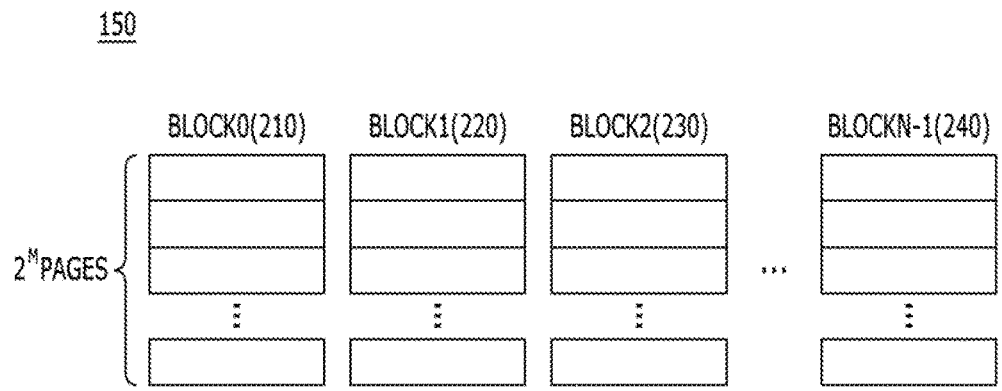
FIG. 2 is a schematic diagram illustrating an exemplary configuration of a memory device employed in the memory system shown in FIG. 1.

FIG. 2 is a schematic diagram illustrating the memory device 150.

Referring to FIG. 2, the memory device 150 may include the plurality of memory blocks BLOCK 0 to BLOCKN−1, and each of the blocks BLOCK 0 to BLOCKN−1 may include a plurality of pages, for example, $2^M$ pages, the number of which may vary according to circuit design. The memory device 150 may include a plurality of memory blocks, as single level cell (SLC) memory blocks and multi-level cell (MLC) memory blocks, according to the number of bits which may be stored or expressed in each memory cell. The SLC memory block may include a plurality of pages which are implemented with memory cells each capable of storing 1-bit data. The MLC memory block may include a plurality of pages which are implemented with memory cells each capable of storing multi-bit data, for example, two or more-bit data. An MLC memory block including a plurality of pages which are implemented with memory cells that are each capable of storing 3-bit data may be defined as a triple level cell (TLC) memory block.

Each of the plurality of memory blocks 210 to 240 may store the data provided from the host device 102 during a write operation, and may provide stored data to the host 102 during a read operation.

Figure 3:
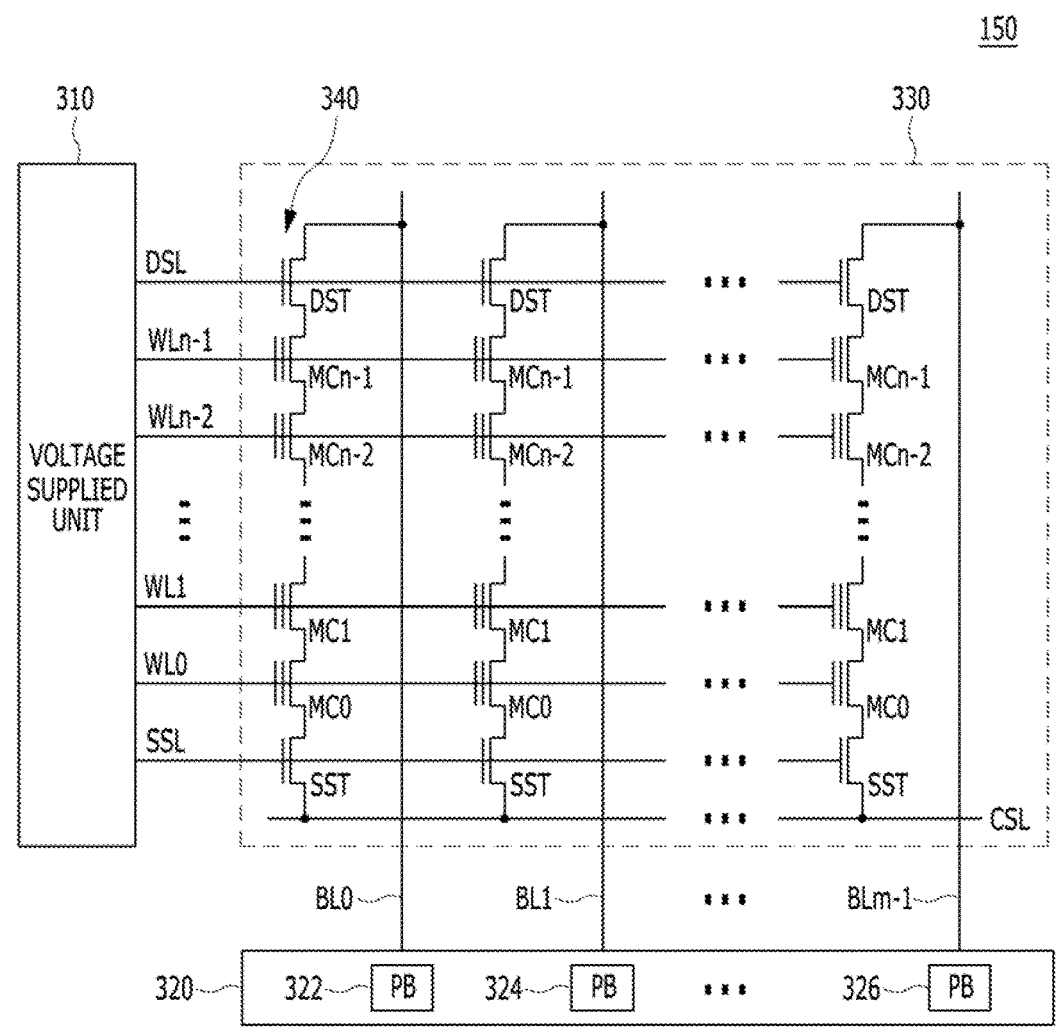
FIG. 3 is a circuit diagram illustrating an exemplary configuration of a memory cell array of a memory block in the memory device shown in FIG. 2.

FIG. 3 is a circuit diagram illustrating a memory block 330 in the memory device 150.

Referring to FIG. 3, the memory block 330 which corresponds to any of the plurality of memory blocks 152 to 156.

Referring to FIG. 3, the memory block 152 of the memory device 150 may include a plurality of cell strings 340 which are electrically coupled to bit lines BL0 to BLm−1, respectively. The cell string 340 of each column may include at least one drain select transistor DST and at least one source select transistor SST. A plurality of memory cells or a plurality of memory cell transistors MC0 to MCn−1 may be electrically coupled in series between the select transistors DST and SST. The respective memory cells MC0 to MCn−1 may be configured by single level cells (SLC) each of which may store 1 bit of information, or by mufti-level cells (MLC) each of which may store data information of a plurality of bits. The strings 340 may be electrically coupled to the corresponding bit lines BL0 to BLm−1, respectively. For reference, in FIG. 3, 'DSL' denotes a drain select line, 'SSL' denotes a source select line, and 'CSL' denotes a common source line.

While FIG. 3 only shows, as an example, the memory block 152 which is configured by NAND flash memory cells, it is to be noted that the memory block 152 of the memory device 150 according to the embodiment is not limited to NAND flash memory and may be realized by NOR flash memory, hybrid flash memory in which at least two kinds of memory cells are combined, or one-NAND flash memory in which a controller is built in a memory chip. The operational characteristics of a semiconductor device may be applied to not only a flash memory device in which a charge storing layer is configured by conductive floating gates but also a charge trap flash (CTF) in which a charge storing layer is configured by a dielectric layer.

A voltage supplied unit 310 of the memory device 150 may provide word line voltages, for example, a program voltage, a read voltage and a pass voltage, to be supplied to respective word lines according to an operation mode and voltages to be supplied to bulks, for example, well regions in which the memory cells are formed. The voltage supplied unit 310 may perform a voltage generating operation under the control of a control circuit (not shown). The voltage supplied unit 310 may generate a plurality of variable read voltages to generate a plurality of read data, select one of the memory blocks or sectors of a memory cell array under the control of the control circuit, select one of the word lines of the selected memory block, and provide the word line voltages to the selected word line and unselected word lines.

A read/write circuit 320 of the memory device 150 may be controlled by the control circuit, and may serve as a sense amplifier or a write driver according to an operation mode. During a verification/normal read operation, the read/write circuit 320 may operate as a sense amplifier for reading data from the memory cell array. During a program operation the read/write circuit 320 may operate as a write driver for driving bit lines according to data to be stored in the memory cell array. During a program operation, the read/write circuit 320 may receive from a buffer (not illustrated) data to be stored into the memory cell array, and drive bit lines according to the received data. The read/write circuit 320 may include a plurality of page buffers 322 to 326 respectively corresponding to columns (or bit lines) or column pairs (or bit line pairs), and each of the page buffers 322 to 326 may include a plurality of latches (not illustrated).

Figure 4:
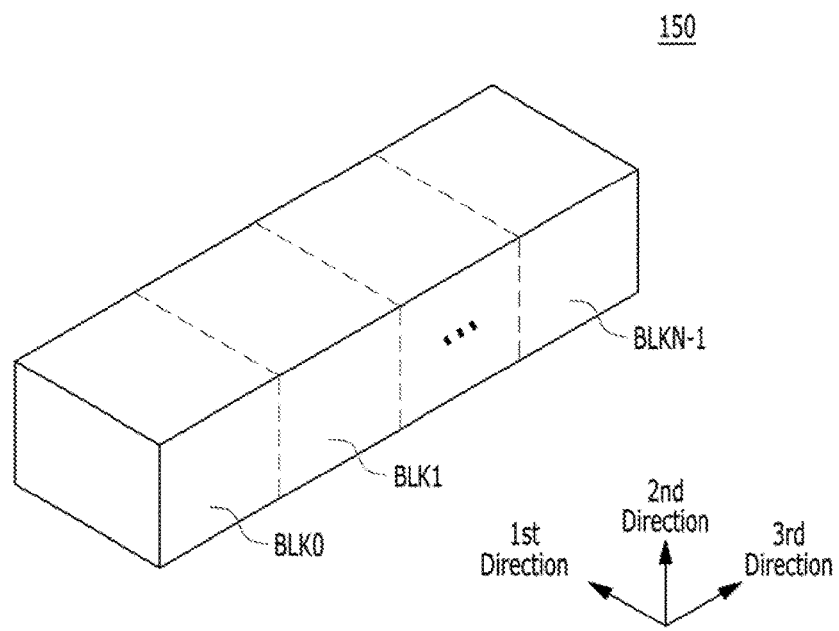
FIG. 4 is a schematic diagram illustrating an exemplary three-dimensional structure of the memory device shown in FIG. 2.

FIG. 4 is a schematic diagram illustrating a 3D structure of the memory device 150.

The memory device 150 may be embodied by a 2D or 3D memory device. Specifically, as illustrated in FIG. 4, the memory device 150 may be embodied by a nonvolatile memory device having a 3D stack structure. When the memory device 150 has a 3D structure, the memory device 150 may include a plurality of memory blocks BLK0 to BLKN−1 each having a 3D structure (or vertical structure).

FIG. 5 is a block diagram illustrating the memory device 150 in accordance with an embodiment of the present invention.

The memory device 150 may include a meta-region 510 and a user data region 530. The meta-region 510 may divided into a first meta-region 511 and a second meta-region 513.

The controller 130 may store a plurality of operation logs into the first meta-region 511.

In accordance with an embodiment of the present invention, the plurality of operation logs may include first to sixth operation logs.

The first operation log may indicate a start of a flush operation to a map data group as a target of the flush operation among a plurality of map data groups, which will be described later.

The second operation log may indicate an end of the flush operation to the map data group as the target of the flush operation.

The third operation log may indicate a location of a first page to store flushed map data in the memory device 150.

The fourth operation log may indicate a location of last page to store flushed map data in the memory device 150.

The fifth operation log may indicate a start of an error management operation to a program error during an operation of programming map data into the second meta-region 513.

The sixth operation log may indicate a location of a last page storing normally flushed map data before the occurrence of the program error.

For example, when the controller 130 performs a flush operation to x-th map data group as a target of the flush operation, the controller 130 may store into the first meta-region 511 the first operation log indicating start of the flush operation to the x-th map data group and the third operation log indicating a location of a first page to store the x-th map data group in the memory device 150 through the flush operation.

The controller 130 may flush map data into the second meta region 513. That is, the controller 130 may program map data of the memory 144 into the second meta-region 513. The flush operation is a kind of a program operation and thus there may occur a program error during the program operation of programming the map data into the second meta-region 513. In this disclosure, a program error may mean an error occurring during a program operation of programming map data into the second meta-region 513. The controller 130 may flush map data into the memory device 150 during a normal power off of the memory system, and may frequently flush map data into the memory device 150. The controller 130 may divide a whole map data into a plurality of map data groups each having a predetermined size (e.g., a size of a segment), and then sequentially flush the plurality of map data groups to store the plurality of map data groups into the second meta-region 513. A performance of the controller 130 and an operation time of the SPOR operation may depend on the predetermined size of the map data group.

The controller 130 may store user data into the user data region 530.

Figure 6:
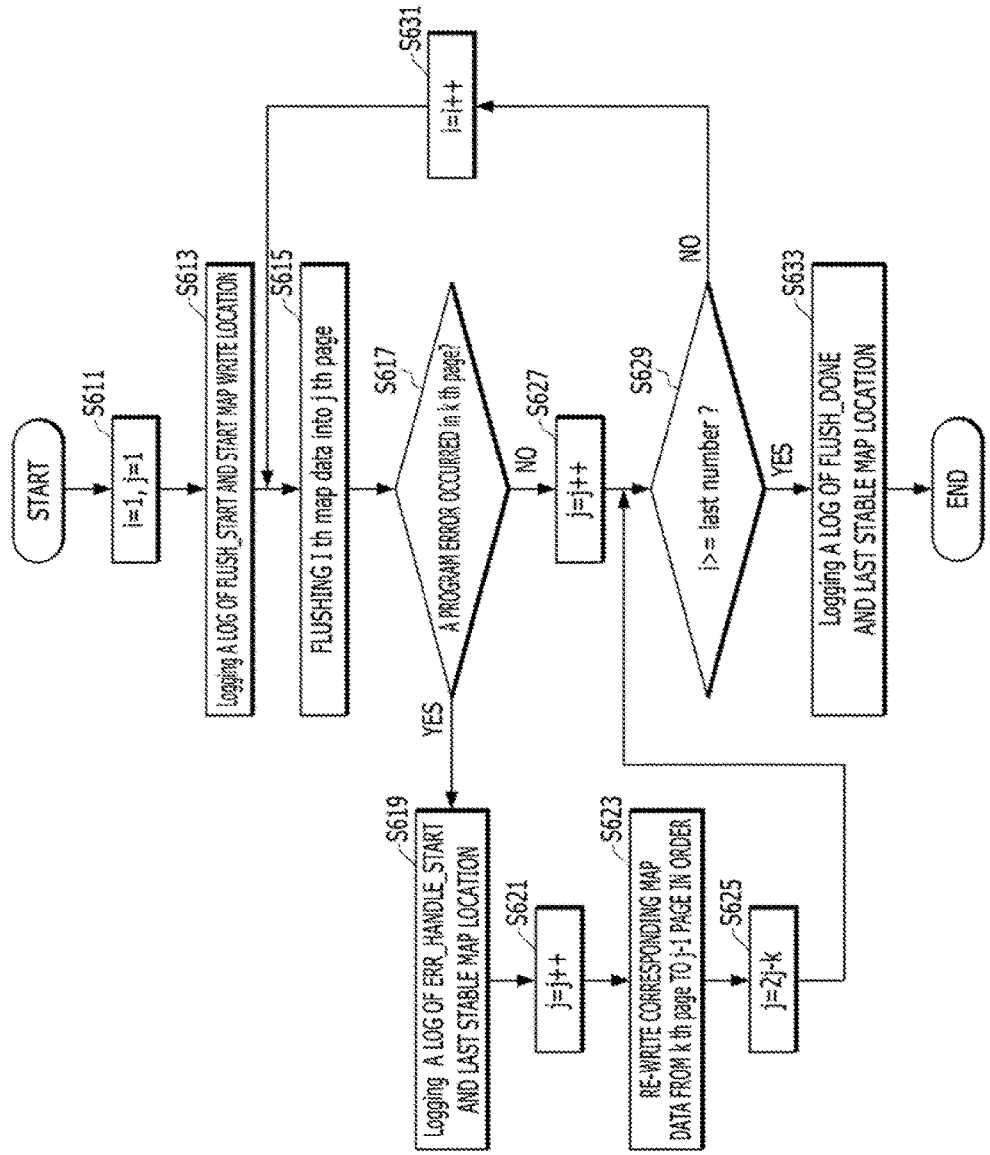
FIG. 6 is a flowchart illustrating, an operation of the controller in accordance with an embodiment of the present invention.
Figure 7:
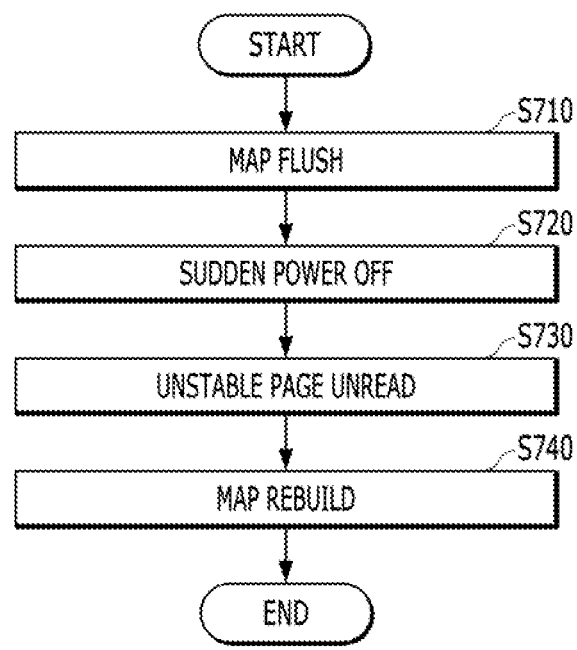
FIG. 7 is a flowchart illustrating an operation of the controller for a SPOR.

FIGS. 6 and 7 are diagrams illustrating a map flush operation of the controller 130 in readiness for a SPOR operation and illustrating a SPOR operation of the controller 130 due to a SPO.

During a SPOR operation, map data may be re-build to indicate the latest valid data. According to a prior art, during a map data re-build operation to map data in a SPOR operation, a controller re-builds a whole map data by reading map data in reverse order from a map data, which is stored lastly in a memory device. Therefore, the controller has to sequentially flush a map data. However, when there occurs a program error or a SPO while a controller is flushing map data, a reliability of an order of map data flushed into a memory device may be lowered. Therefore, according to a prior art, a controller stores a corresponding map data as a whole into a memory device again. However, according to the prior art, the operation of storing the whole map data into a memory device again increases operation time of power off. Further, according to the prior art, a lifetime of a memory device decreases and operation time of a SPQR operation increases since an amount of map data programmed into blocks of a memory device increases.

FIG. 6 is a flowchart illustrating an operation of the controller 130 in accordance with an embodiment of the present invention. FIG. 6 shows a map flush operation of flushing map data into the memory device 150 in a general case and in a case where there occurs a program error while the controller 130 is flushing map data. For the convenience of description, it is assumed that the controller 130 flushes into the memory device 150 one map data group of a plurality of map data groups each having a predetermined size of a segment.

At step S611, an initial index value may be set (i.e., i=1 and j=1). The index 'i' may indicate an order of map data included in a map data group as a target of a flush operation, and the index 'j' may indicate an order of pages to store map data in the memory device 150.

At step S613 the controller 130 may store into the first meta-region 511 the first operation log indicating start of a flush operation to a map data group as a target of the flush operation and the third operation log indicating a location of a first page to store the map data group as a target of the flush operation in the memory device 150 through the flush operation.

At step S615, the controller 130 may flush map data into the second meta-region 513. For example, the controller 130 may flush and program i-th map data of the map data group as a target of the flush operation into j-th page of the second meta-region 513.

At step S617, the controller 130 may determine whether or not there occurs a program error while flushing map data into the memory device 150 through a verify operation.

The controller 130 may alternately perform the flush operation of flushing map data into the memory device 150 and the verify operation of determining whether or not there occurs a program error while flushing map data into the memory device 150. Therefore, when a target page of the flush operation is a j-th page, the j-th page may be different from a k-th page, in which a program error is determined to occur. The k-th page may be the j-th page or a previous page of the j-th page.

When there occurs a program error in a k-th page of the second meta-region 513 while the controller 130 is flushing map data of a map data group as a target of the flush operation, the controller 130 may perform steps S619 to S625. On the other hand, when there does not occur a program error in a k-th page of the second meta-region 513 while the controller 130 is flushing map data of a map data group as a target of the flush operation, the controller 130 may perform step S627.

When there occurs a program error in a k-th page of the second meta-region 513 while the controller 130 is flushing map data of a map data group as a target of the flush operation ("YES" at step S617), the controller 130 at step S619 may store into the first meta-region 511 the fifth operation log indicating start of an error management operation to a program error, which occurs during an operation of flushing map data into the second meta-region 513, and the sixth operation log indicating a location of a last page storing normally flushed map data before the occurrence of the program error.

For example, the last page may be a (k−1)-th page storing normally flushed map data before the occurrence of the program error in a k-th page. For example, when there occurs a program error in a third (i.e., k=3) page of the second meta-region 513 while the controller 130 is flushing map data of a map data group as a target of the flush operation into a fifth page (i.e., j=5), the controller 130 at step S619 may store the fifth operation log indicating start of an error management operation and the sixth operation log indicating a location of a second page (i.e., k−1=2).

At step S621, the controller 130 may increase a value of the page index 'j' by an amount of 1.

At step S623, the controller 130 may duplicate into the second meta-region 513 map data stored in from the k-th page to the (j−1)-th page by flushing again map data of the memory 144 into the second meta-region 513. As described above, the k-th page may be the one in which the program error occurs, and the (j−1)-th page may be the one that last store map data before the start of the error management operation.

For example, when a program error occurs in a third page (i.e. k=3) of the second meta-region 513 and map data is last stored in a fifth page (i.e., j=6 and j−1=5) of the second meta-region 513 before the start of the error management operation, the controller 130 may duplicate map data of third to fifth pages into sixth to eighth pages through steps S621 to S623.

At step S625, the controller 130 may increase a value of the page index 'j' by an amount of '2j-k' for a flush operation of flushing map data stored in a page (in case of the above described example, a ninth page) following the page, in which the duplicated storage is completed through step S623. The increment '2j-k' may represent a sum of 'j-k' indicating a number of pages (in case of the above described example, j−k=6−3=3), in which map data is duplicated 'j-1' indicating a number of pages (in case of the above described example, j−1=6−1=5), which stores flushed map data before the start of the error management operation, and one (1) representing the increment to indicate a page following the page, in which the duplicated storage is completed through step S623.

Next, step S629 that will be described later may be performed to the page following the page, in which the duplicated storage is completed through step S623.

On the other hand, when there does not occur a program error in a k-th page of the second meta-region 513 while the controller 130 is flushing map data of a map data group as a target of the flush operation ("NO" at step S617), the controller 130 at step S627 may increase a value of the page index 'j' by an amount of 1.

At step S629, the controller 130 may determine whether or not a flush operation is performed to all of map data of a map data group as a target of the flush operation by determining whether or not a current value of the map data index 'i' is a maximum value.

As a result of the determination of step S629, when a flush operation is not yet performed to all of map data of a map data group as a target of the flush operation ("NO" at step S629), the controller 130 at step S631 may increase a value of the map data index 'i' by an amount of 1 and may repeat steps S615 to S629 to a map data indicated by the map data index 'i' of the currently increased value.

As a result of the determination of step S629, when a flush operation is performed to all of map data of a map data group as a target of the flush operation ("YES" at step S629), the controller 130 at step S633 may store into the first meta-region 511 the second operation log indicating end of the flush operation to the map data group as the target of the flush operation and the fourth operation log indicating a location of a last page to store flushed map data in the memory device 150.

As described above in accordance with an embodiment of the present invention, when there occurs a program error while flushing map data into the second meta-region 513, start of an error management operation to the program error and a location of a last page storing normally flushed map data before the occurrence of the program error may be identified from the fifth and sixth operation logs. That is, information of map data, which is duplicated in the second meta-region 513 through step S623, may be identified from the fifth and sixth operation logs. Described with reference to FIG. 7 will be an operation of the controller 130 performing simplified a SPOR operation according to the fifth and sixth operation logs.

FIG. 7 is a flowchart illustrating an operation of the controller 130 for a SPOR. FIG. 7 is a flowchart illustrating an operation of the controller 130 performing a recovery operation of recovering data when there occurs a SPO while the controller 130 is flushing map data into the memory device 150.

The memory 144 may be a nonvolatile memory device or a volatile memory device, as described with reference to FIG. 1. A volatile memory device loses data stored therein when a power supply thereto is interrupted. Therefore, there is a need for recovery of lost data. Hereinafter, it is assumed that the memory 144 is a volatile memory for the convenience of description.

As described above, map data may be re-build to indicate the latest valid data during a SPOR operation. During a general SPOR operation, the controller 130 may read whole map data in reverse order from a map data, which is stored lastly in the memory device 150 and load the read map data to the memory 144, and may update map data by scanning user block, which is not reflected into the map data.

At step S710, the controller 130 may flush map data into the memory device 150 through steps S601 to S633 described with reference to FIG. 6. While a SPO does not occur, the controller 130 may perform a flush operation normally.

However, a SPO may occur during a normal flush operation of flushing map data at step S720. When a program error occurs as described with reference to FIG. 6, a SPO may also occur during an error management operation, that is, during steps S619 to S625. Whole data stored in the memory 144 may be lost due to a SPO.

Therefore, the controller 130 may perform an operation of re-building map data or a SPOR operation according to steps S730 and S740.

As described above, during a general SPOR operation, the controller 130 may read whole map data in reverse order from a map data, which is stored lastly in the memory device 150. However, map data last flushed stored into page at the occurrence time of a SPO at step S730 may be unstable and unreliable. Therefore, the unstable and unreliable page may not be used when the controller 130 re-builds map data. That is, the controller 130 may not use map data stored in the unstable and unreliable page and may sequentially and consecutively read map. For example, when a SPO occurs while flushing map data into a sixth page, the controller 130 may not use map data stored in the sixth page and may use map data stored in a fifth page during a SPOR operation.

At step S740, the controller 130 may not use unstable and unreliable page and may read map data stored in the memory device 150 according to the first to sixth operation logs. Further, the controller 130 may update map data by scanning user block, which is not reflected into the map data.

For example, it is assumed that the controller 130 flushes a map data group including 10 pieces of map data. Further, it is assumed that a program error occurs in a third page while the controller 130 is flushing a fifth map data into a sixth page, the controller 130 sequentially duplicates third to fifth map data into sixth to eighth pages, respectively, and then a SPO occurs while the controller 130 is flushing a seventh map data into a tenth page. In this case, a SPOR operation may be performed as follows.

First, the controller 130 may not use the seventh map data stored in the unstable and unreliable tenth page due to the SPO as described with reference to step S730. Next, the controller 130 may read sixth to third map data respectively stored in ninth to sixth pages. Now, the controller 130 may identify information about state of the error management operation and the location of a last page (i.e., the second page) storing normally flushed map data before the occurrence of the program error from the fifth and sixth operation logs. Therefore the controller 130 may not read again the third to fifth map data, which are duplicated in the third to fifth pages, respectively. Further, the controller 130 may read second and first map data respectively stored in second and first pages. Further, the controller 130 may identify that a flush operation begins from the first page according to the first and third operation logs, and may end re-building map data of a map data group.

In another example described above, when map data of a map data group including 10 pieces of map data are normally flushed or when first to tenth map data are respectively flushed into first to tenth pages, the controller 130 may identify that the flush operation is normally completed at the tenth page according to the second and fourth operation logs. Therefore, the controller 130 may read map data in reverse order from the tenth map data stored in the tenth page. Further, the controller 130 may identify that the flush operation begins at the first page according to the first and third operation logs, and may end re-building map data of a map data group.

Further, the controller 130 may update map data by scanning user block, which is not reflected into the map data.

Accordingly, map data stored in the memory device 150 before occurrence of a SPO may be re-built and loaded into the memory 144.

In accordance with an embodiment of the present invention, even when a program error occurs while the controller 130 is flushing map data, the controller 130 may sequentially flush map data into the second meta-region 513. Further, the controller 130 may re-build the map data stored in the memory device 150 by reading the map data stored in the memory device 150 in reverse order and may load into the memory 144 even when a SPO occurs while the controller 130 is flushing map data. On the other hand, there may be duplicated map data in the memory device 150 when a program error occurs. However, the duplicated map data may not be read according to the fifth operation log indicating start of an error management operation and the sixth operation log indicating a location of a last page storing normally flushed map data before the occurrence of the program error wherein the fifth and sixth operation logs being stored in the first meta-region 511.

Therefore, even when a program error or a SPO occurs, the controller 130 may read map data in reverse order according to the operation logs stored in the first meta-region 511. Further, the controller 130 may re-build map data through the read operation.

FIGS. 8 to 16 are diagrams schematically illustrating application examples of the data processing system of FIGS. 1 to 7 according to various embodiments.

Figure 8:
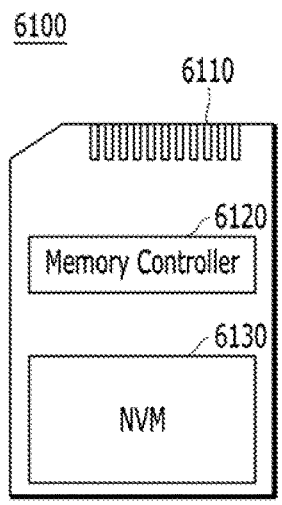
FIGS. 8 to 16 are diagrams schematically illustrating application examples of a data processing system, in accordance with various embodiments of the present invention.

FIG. 8 is a diagram schematically illustrating another example of the data processing system including the memory system in accordance with the present embodiment. FIG. 8 schematically illustrates a memory card system to which the memory system in accordance with the present embodiment is applied.

Referring to FIG. 8, the memory card system 6100 may include a memory controller 6120, a memory device 6130 and a connector 6110.

More specifically, the memory controller 6120 may be connected to the memory device 6130 embodied by a nonvolatile memory, and configured to access the memory device 6130. For example, the memory controller 6120 may be configured to control read, write, erase and background operations of the memory device 6130. The memory controller 6120 may be configured to provide an interface between the memory device 6130 and a host, and drive firmware for controlling the memory device 6130. That s the memory controller 6120 may correspond to the controller 130 of the memory system 110 described with reference to FIGS. 1 to 7, and the memory device 6130 may correspond to the memory device 150 of the memory system 110 described with reference to FIGS. 1 to 7.

Thus, the memory controller 6120 may include a RAM, a processing unit, a host interface, a memory interface and an error correction unit. The memory controller 130 may further include the elements described in FIG. 1.

The memory controller 6120 may communicate with an external device, for example, the host 102 of FIG. 1 through the connector 6110. For example, as described with reference to FIG. 1, the memory controller 6120 may be configured to communicate with an external device through one or more of various communication protocols such as universal serial bus (USB), multimedia card (MMC), embedded MMC (eMMC), peripheral component interconnection (PCI), PCI express (PCIe), Advanced Technology Attachment (ATA), Serial-ATA, Parallel-ATA, small computer system interface (SCSI), enhanced small disk interface (EDSI), Integrated Drive Electronics (IDE), Firewire, universal flash storage (UFS), WIFI and Bluetooth. Thus, the memory system and the data processing system in accordance with the present embodiment may be applied to wired/wireless electronic devices or particularly mobile electronic devices.

The memory device 6130 may be implemented by a nonvolatile memory. For example the memory device 6130 may be implemented by various nonvolatile memory devices such as an erasable and programmable ROM (EPROM), an electrically erasable and programmable ROM (EEPROM), a NAND flash memory, a NOR flash memory, a phase-change RAM (PRAM), a resistive RAM (ReRAM), a ferroelectric RAM (FRAM) and a spin torque transfer magnetic RAM (STT-RAM). The memory device 6130 may include a plurality of dies as in the memory device 150 of FIG. 1.

The memory controller 6120 and the memory device 6130 may be integrated into a single semiconductor device. For example, the memory controller 6120 and the memory device 6130 may construct a solid state driver (SSD) by being integrated into a single semiconductor device. Also, the memory controller 6120 and the memory device 6130 may construct a memory card such as a PC card (PCMCIA: Personal Computer Memory Card International Association), a compact flash (CF) card, a smart media card (e.g., SM and SMC), a memory stick, a multimedia card (e.g., MMC, RS-MMC, MMCmicro and eMMC), an SD card (e.g., SD, miniSD, microSD and SDHC) and a universal flash storage (UFS).

Figure 9:
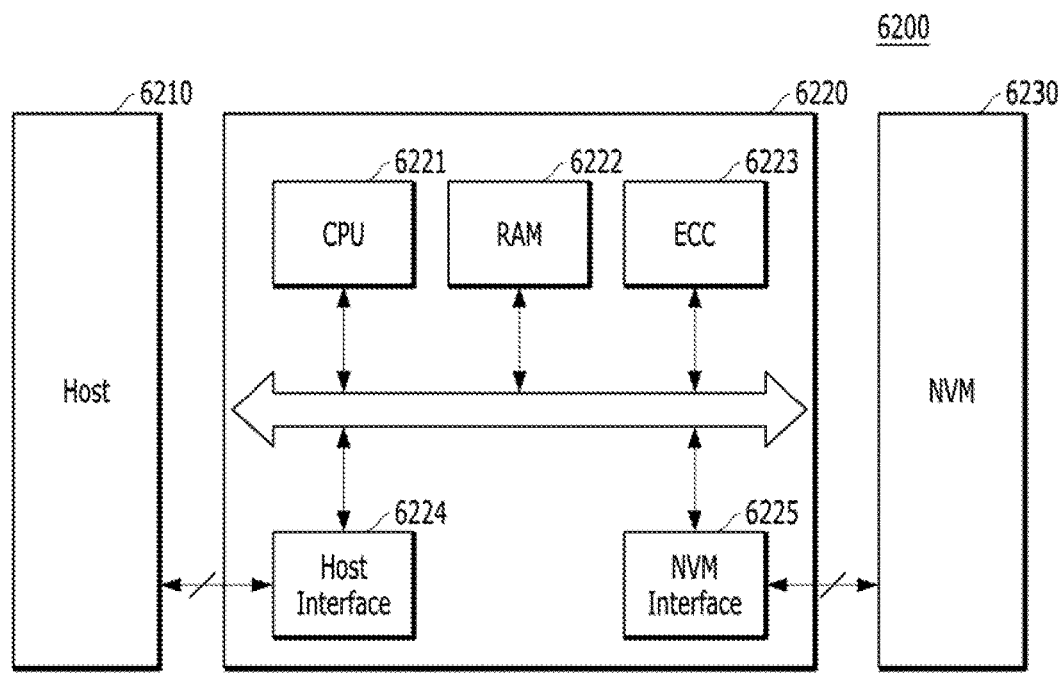

FIG. 9 is a diagram schematically illustrating another example of the data processing system including a memory system, in accordance with the present embodiment.

Referring to FIG. 9, the data processing system 6200 may include a memory device 6230 having one or more nonvolatile memories and a memory controller 6220 for controlling the memory device 6230. The data processing system 6200 illustrated in FIG. 9 may serve as a storage medium such as a memory card (CF, SD, micro-SD or the like) or USB device, as described with reference to FIG. 1. The memory device 6230 may correspond to the memory device 150 in the memory system 110 described in FIGS. 1 to 7, and the memory controller 6220 may correspond to the controller 130 in the memory system 110 described in FIGS. 1 to 7.

The memory controller 6220 may control a read, write or erase operation on the memory device 6230 in response to a request of the host 6210, and the memory controller 6220 may include one or more CPUs 6221, a buffer memory such as RAM 6222, an ECC circuit 6223, a host interface 6224 and a memory interface such as an NVM interface 6225.

The CPU 6221 may control the operations on the memory device 6230, for example, read, write, file system management and bad page management operations. The RAM 6222 may be operated according to control of the CPU 6221, and used as a work memory, buffer memory or cache memory. When the RAM 6222 is used as a work memory, data processed by the CPU 6221 may be temporarily stored in the RAM 6222. When the RAM 6222 is used as a buffer memory, the RAM 6222 may be used for buffering data transmitted to the memory device 6230 from the host 6210 or transmitted to the host 6210 from the memory device 6230. When the RAM 6222 is used as a cache memory, the RAM 6222 may assist the low-speed memory device 6230 to operate at high speed.

The ECC circuit 6223 may correspond to the FCC unit 138 illustrated in FIG. 1. As described with reference to FIG. 1, the ECC circuit 6223 may generate an ECC (Error Correction Code) for correcting a fail bit or error bit of data provided from the memory device 6230. The ECC circuit 6223 may perform error correction encoding on data provided to the memory device 6230, thereby forming data with a parity bit. The parity bit may be stored in the memory device 6230. The ECC circuit 6223 may perform error correction decoding on data outputted from the memory device 6230. At this time, the ECC circuit 6223 may correct an error using the parity bit. For example, as described with reference to FIG. 1 the ECC circuit 6223 may correct an error using the LDPC code, BCH code, turbo code, Reed-Solomon code, convolution code, RSC or coded modulation such as TCM or BCM.

The memory controller 6220 may transmit/receive data to/from the host 6210 through the host interface 6224, and transmit/receive data to/from the memory device 6230 through the NVM interface 6225. The host interface 6224 may be connected to the host 6210 through a PATA bus, SATA bus, SCSI, USB, PCIe or NAND interface. The memory controller 6220 may have a wireless communication function with a mobile communication protocol such as WiFi or Long Term Evolution (LTE). The memory controller 6220 may be connected to an external device, for example the host 6210 or another external device, and then transmit/receive data to/from the external device. In particular, as the memory controller 6220 is configured to communicate with the external device through one or more of various communication protocols, the memory system and the data processing system in accordance with the present embodiment may be applied to wired/wireless electronic devices or particularly a mobile electronic device.

Figure 10:
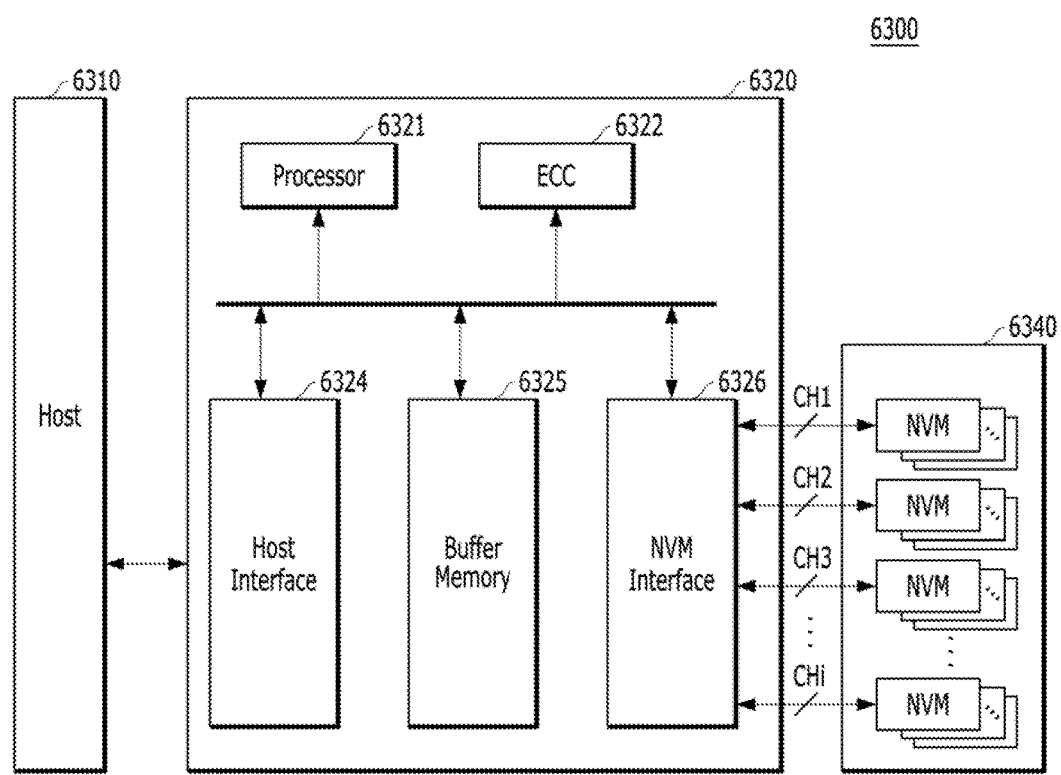

FIG. 10 is a diagram schematically illustrating another example of the data processing system including the memory system in accordance with the present embodiment. FIG. 10 schematically illustrates an SSD to which the memory system in accordance with the present embodiment is applied.

Referring to FIG. 10, the SSD 6300 may include a controller 6320 and a memory device 6340 including a plurality of nonvolatile memories. The controller 6320 may correspond to the controller 130 in the memory system 110 of FIG. 1, and the memory device 6340 may correspond to the memory device 150 in the memory system of FIG. 1.

More specifically, the controller 6320 may be connected to the memory device 6340 through a plurality of channels CH1 to CHi. The controller 6320 may include one or more processors 6321, a buffer memory 6325, an ECC circuit 6322, a host interface 6324 and a memory interface, for example, a nonvolatile memory interface 6326.

The buffer memory 6325 may temporarily store data provided from the host 6310 or data provided from a plurality of flash memories NVM included in the memory device 6340, or temporarily store meta-data of the plurality of flash memories NVM, for example, map data including a mapping table. The buffer memory 6325 may be embodied by volatile memories such as DRAM, SDRAM, DDR SDRAM, LPDDR SDRAM and GRAM or nonvolatile memories such as FRAM, ReRAM, STT-MRAM and PRAM. For convenience of description, FIG. 10 illustrates that the buffer memory 6325 exists in the controller 6320. However, the buffer memory 6325 may exist outside the controller 6320.

The ECC circuit 6322 may calculate an ECC value of data to be programmed to the memory device 6340 during a program operation, perform an error correction operation on data read from the memory device 6340 based on the ECC value during a read operation, and perform an error correction operation on data recovered from the memory device 6340 during a failed data recovery operation.

The host interface 6324 may provide an interface function with an external device, for example, the host 6310, and the nonvolatile memory interface 6326 may provide an interface function with the memory device 6340 connected through the plurality of channels.

Furthermore, a plurality of SSDs 6300 to which the memory system 110 of FIG. 1 is applied may be provided to embody a data processing system, for example, RAID (Redundant Array of Independent Disks) system. At this time, the RAID system may include the plurality of SSDs 6300 and a RAID controller for controlling the plurality of SSDs 6300. When the RAID controller performs a program operation in response to a write command provided from the host 6310, the RAID controller may select one or more memory systems or SSDs 6300 according to a plurality of RAID levels, that is, RAID level information of the write command provided from the host 6310 in the SSDs 6300, and output data corresponding to the write command to the selected SSDs 6300. Furthermore, when the RAID controller performs a read command in response to a read command provided from the host 6310, the RAID controller may select one or more memory systems or SSDs 6300 according to a plurality of RAID levels, that is, RAID level information of the read command provided from the host 6310 in the SSDs 6300, and provide data read from the selected SSDs 6300 to the host 6310.

Figure 11:
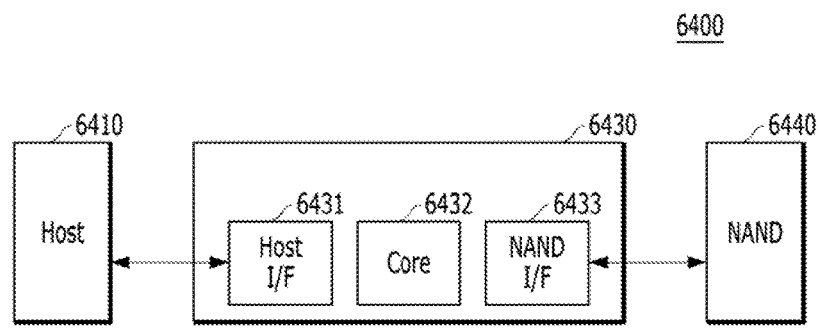

FIG. 11 is a diagram schematically illustrating another example of the data processing system including the memory system in accordance with an embodiment. FIG. 11 schematically illustrates an embedded Multi-Media Card (eMMC) to which the memory system in accordance with an embodiment is applied.

Referring to FIG. 11, the eMMC 6400 may include a controller 6430 and a memory device 6440 embodied by one or more NAND flash memories. The controller 6430 may correspond to the controller 130 in the memory system 110 of FIG. 1, and the memory device 6440 may correspond to the memory device 150 in the memory system 110 of FIG. 1.

More specifically, the controller 6430 may be connected to the memory device 6440 through a plurality of channels. The controller 6430 may include one or more cores 6432, a host interface 6431 and a memory interface, for example, a NAND interface 6433.

The core 6432 may control the operations of the eMMC 6400, the host interface 6431 may provide an interface function between the controller 6430 and the host 6410, and the NAND interface 6433 may provide an interface function between the memory device 6440 and the controller 6430. For example, the host interface 6431 may serve as a parallel interface, for example, MMC interface as described with reference to FIG. 1. Furthermore, the host interface 6431 may serve as a serial interface, for example, UHS ((Ultra High Speed)-I/UHS-II) interface.

FIGS. 12 to 15 are diagrams schematically illustrating other examples of the data processing system including the memory system in accordance with an embodiment. FIGS. 12 to 15 schematically illustrate UFS (Universal Flash Storage) systems to which the memory system in accordance with an embodiment is applied.

Referring to FIGS. 12 to 15, the UFS systems 6500, 6600, 6700 and 6800 may include hosts 6510, 6610, 6710 and 6810, UFS devices 6520, 6620, 6720 and 6820 and UFS cards 6530, 6630, 6730 and 6830, respectively. The hosts 6510, 6610, 6710 and 6810 may serve as application processors of wired/wireless electronic devices or particularly mobile electronic devices, the UFS devices 6520, 6620, 6720 and 6820 may serve as embedded UFS devices, and the UFS cards 6530, 6630, 6730 and 6830 may serve as external embedded UFS devices or removable UFS cards.

The hosts 6510, 6610, 6710 and 6810, the UFS devices 6520, 6620, 6720 and 6820 and the UFS cards 6530, 6630, 6730 and 6830 in the respective UFS systems 6500, 6600, 6700 and 6800 may communicate with external devices, for example, wired/wireless electronic devices or particularly mobile electronic devices through UFS protocols, and the UFS devices 6520, 6620, 6720 and 6820 and the UFS cards 6530, 6630, 6730 and 6830 may be embodied by the memory system 110 illustrated in FIG. 1. For example, in the UFS systems 6500, 6600, 6700 and 6800, the UFS devices 6520, 6620, 6720 and 6820 may be embodied n the form of the data processing system 6200, the SSD 6300 or the eMMC 6400 described with reference to FIGS. 9 to 11, and the UFS cards 6530, 6630, 6730 and 6830 may be embodied in the form of the memory card system 6100 described with reference to FIG. 8.

Furthermore, in the UFS systems 6500, 6600, 6700 and 6800, the hosts 6510, 6610, 6710 and 6810, the UFS devices 6520, 6620, 6720 and 6820 and the UFS cards 6530, 6630, 6730 and 6830 may communicate with each other through an UFS interface, for example, MIPI M-PHY and MIPI UniPro (Unified Protocol) in MIPI (Mobile Industry Processor Interface). Furthermore, the UFS devices 6520, 6620, 6720 and 6820 and the UFS cards 6530, 6630, 6730 and 6830 may communicate with each other through various protocols other than the UFS protocol, for example, UFDs, MMC, SD, mini-SD, and micro-SD.

Figure 12:
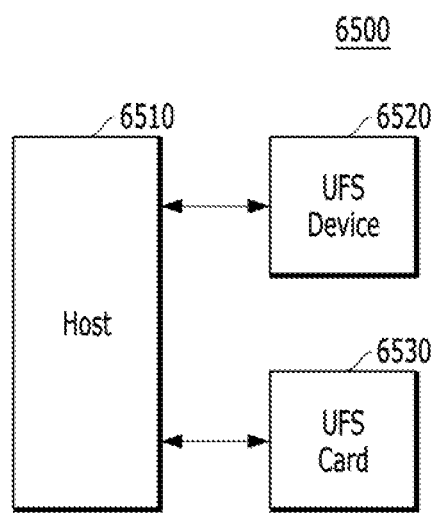

In the UFS system 6500 illustrated in FIG. 12, each of the host 6510, the UFS device 6520 and the UFS card 6530 may include UniPro. The host 6510 may perform a switching operation in order to communicate with the UFS device 6520 and the UFS card 6530. In particular, the host 6510 may communicate with the UFS device 6520 or the UFS card 6530 through link layer switching, for example, L3 switching at the UniPro. At this time, the UFS device 6520 and the UFS card 6530 may communicate with each other through link layer switching at the UniPro of the host 6510. In the present embodiment, the configuration in which one UFS device 6520 and one UFS card 6530 are connected to the host 6510 has been exemplified for convenience of description. However, a plurality of UFS devices and UFS cards may be connected in parallel or in the form of a star to the host 6410, and a plurality of UFS cards may be connected in parallel or in the form of a star to the UFS device 6520 or connected in series or in the form of a chain to the UFS device 6520.

Figure 13:
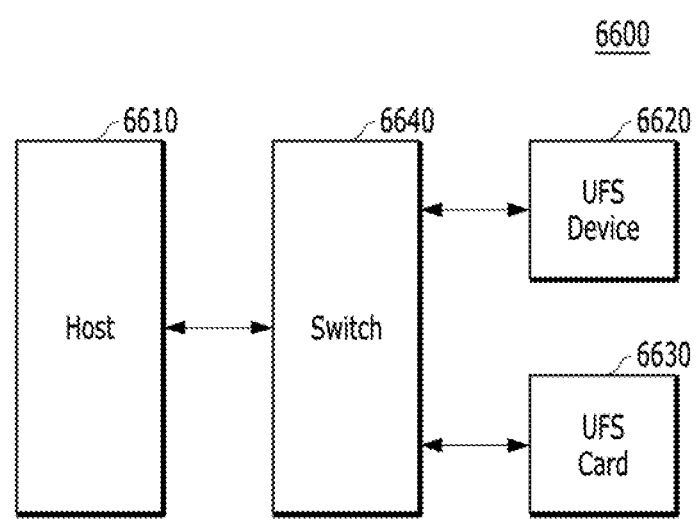

In the UFS system 6600 illustrated in FIG. 13, each of the host 6610, the UFS device 6620 and the UFS card 6630 may include UniPro, and the host 6610 may communicate with the UFS device 6620 or the UFS card 6630 through a switching module 6640 performing a switching operation, for example, through the switching module 6640 which performs link layer switching at the UniPro, for example, L3 switching. The UFS device 6620 and the UFS card 6630 may communicate with each other through link layer switching of the switching module 6640 at UniPro. In the present embodiment, the configuration in which one UFS device 6620 and one UFS card 6630 are connected to the switching module 6640 has been exemplified for convenience of description. However, a plurality of UFS devices and UFS cards may be connected in parallel or in the form of a star to the switching module 6640, and a plurality of UFS cards may be connected in series or in the form of a chain to the UFS device 6620.

Figure 14:
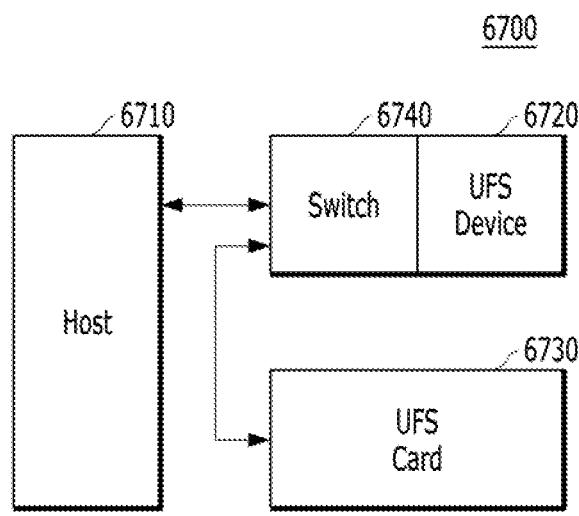

In the UFS system 6700 illustrated in FIG. 14, each of the host 6710, the UFS device 6720 and the UFS card 6730 may include UniPro, and the host 6710 may communicate with the UFS device 6720 or the UFS card 6730 through a switching module 6740 performing a switching operation, for example, through the switching module 6740 which performs link layer switching at the UniPro, for example, L3 switching. At this time, the UFS device 6720 and the UFS card 6730 may communicate with each other through link layer switching of the switching module 6740 at the UniPro, and the switching module 6740 may be integrated as one module with the UFS device 6720 inside or outside the UFS device 6720. In the present embodiment the configuration in which one UFS device 6720 and one UFS card 6730 are connected to the switching module 6740 has been exemplified for convenience of description. However, a plurality of modules each including the switching module 6740 and the UFS device 6720 may be connected in parallel or in the form of a star to the host 6710 or connected in series or in the form of a chain to each other. Furthermore a plurality of UFS cards may be connected in parallel or in the form of a star to the UFS device 6720.

Figure 15:
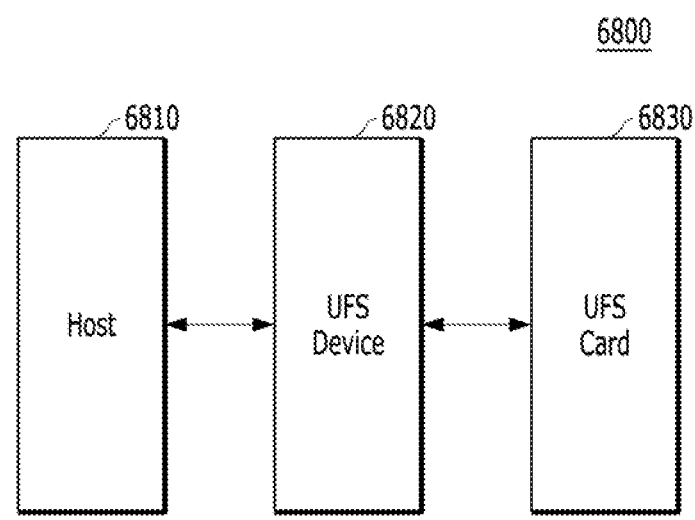

In the UFS system 6800 illustrated in FIG. 15, each of the host 6810, the UFS device 6820 and the UFS card 6830 may include M-PHY and UniPro. The UFS device 6820 may perform a switching operation in order to communicate with the host 6810 and the UFS card 6830. In particular, the UFS device 6820 may communicate with the host 6810 or the UFS card 6830 through a switching operation between the M-PHY and UniPro module for communication with the host 6810 and the M-PHY and UniPro module for communication with the UFS card 6830, for example, through a target ID (Identifier) switching operation. At this time, the host 6810 and the UFS card 6830 may communicate with each other through target ID switching between the M-PHY and UniPro modules of the UFS device 6820. In the present embodiment, the configuration in which one UFS device 6820 is connected to the host 6810 and one UFS card 6830 is connected to the UFS device 6820 has been exemplified for convenience of description. However, a plurality of UFS devices may be connected in parallel or in the form of a star to the host 6810, or connected in series or in the form of a chain to the host 6810, and a plurality of UFS cards may be connected in parallel or in the form of a star to the UFS device 6820, or connected in series or in the form of a chain to the UFS device 6820.

Figure 16:
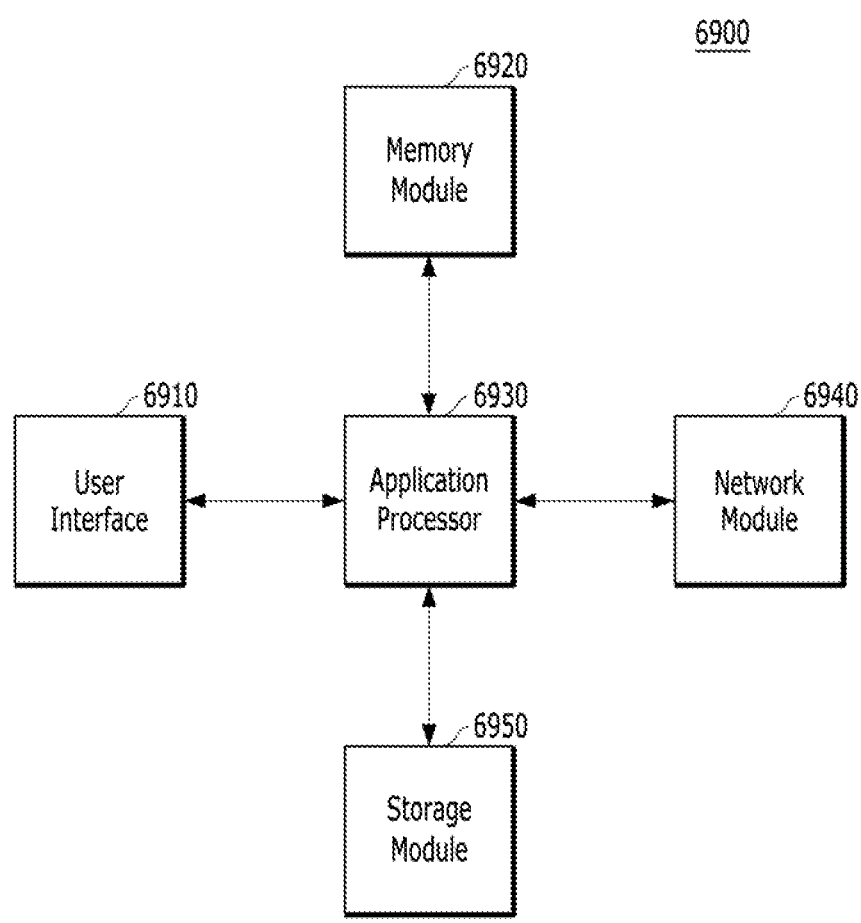

FIG. 16 is a diagram schematically illustrating another example of the data processing system including the memory system in accordance with an embodiment. FIG. 16 is a diagram schematically illustrating a user system to which the memory system in accordance with an embodiment is applied.

Referring to FIG. 16, the user system 6900 may include an application processor 6930, a memory module 6920, a network module 6940, a storage module 6950 and a user interface 6910.

More specifically, the application processor 6930 may drive components included in the user system 6900, for example, an OS, and include controllers, interfaces and a graphic engine which control the components included in the user system 6900. The application processor 6930 may be provided as a System-on-Chip (SoC).

The memory module 6920 may be used as a main memory, work memory, buffer memory or cache memory of the user system 6900. The memory module 6920 may include a volatile RAM such as DRAM, SDRAM, DDR SDRAM, DDR2 SDRAM, DDR3 SDRAM, LPDDR SDARM, LPDDR3, SDRAM or LPDDR3 SDRAM or a nonvolatile RAM such as PRAM, ReRAM, MRAM or FRAM. For example, the application processor 6930 and the memory module 6920 may be packaged and mounted, based on POP (Package on Package).

The network module 6940 may communicate with external devices. For example, the network module 6940 may not only support wired communication, but may also support various wireless communication protocols such as code division multiple access (CDMA), global system for mobile communication (GSM), wideband CDMA (WCDMA), CDMA-2000, time division multiple access (TDMA), long term evolution (LTE), worldwide interoperability for microwave access (Wimax), wireless local area network (WLAN), ultra-wideband (UWB), Bluetooth, wireless display (WI-DI), thereby communicating with wired/wireless electronic devices or particularly mobile electronic devices. Therefore, the memory system and the data processing system, in accordance with an embodiment of the present invention, can be applied to wired/wireless electronic devices. The network module 6940 may be included in the application processor 6930.

The storage module 6950 may store data, for example, data received from the application processor 6930, and then may transmit the stored data to the application processor 6930. The storage module 6950 may be embodied by a nonvolatile semiconductor memory device such as a phase-change RAM (PRAM), a magnetic RAM (MRAM), a resistive RAM (ReRAM), a NAND flash, NOR flash and 3D NAND flash, and provided as a removable storage medium such as a memory card or external drive of the user system 6900. The storage module 6950 may correspond to the memory system 110 described with reference to FIG. 1. Furthermore, the storage module 6950 may be embodied as an SSD, eMMC and UFS as described above with reference to FIGS. 8 to 15.

The user interface 6910 may include interfaces for inputting data or commands to the application processor 6930 or outputting data to an external device. For example, the user interface 6910 may include user input interfaces such as a keyboard, a keypad, a button, a touch panel, a touch screen, a touch pad, a touch ball, a camera, a microphone, a gyroscope sensor, a vibration sensor and a piezoelectric element, and user output interfaces such as a liquid crystal display (LCD), an organic light emitting diode (OLED) display device, an active matrix OLED (AMOLED) display device, an LED, a speaker and a motor.

Furthermore, when the memory system 110 of FIG. 1 is applied to a mobile electronic device of the user system 6900, the application processor 6930 may control the operations of the mobile electronic device, and the network module 6940 may serve as a communication module for controlling wired/wireless communication with an external device. The user interface 6910 may display data processed by the processor 6930 on a display/touch module of the mobile electronic device, or support a function of receiving data from the touch panel.

While the present invention has been described with respect to specific embodiments, it will be apparent to those skilled in the art that various changes and modifications may be made without departing from the spirit and scope of the invention as defined in the following claims.

What is claimed is:

1. An operating method of memory system including a controller having a memory for storing map data and a memory device having meta-regions and a user data region, comprising:

a first step of storing, by the controller, a plurality of operation logs of the controller into a first meta-region included in the meta-regions of the memory device; and a second step of dividing, by the controller, the map data stored in the memory into a plurality of map data groups each having a predetermined size, and flushing, by the controller, the map data divided into the plurality of map data groups, into a second meta-region included in the meta-regions of the memory device, wherein the plurality of operation logs include first to sixth operation logs, and wherein the first operation log indicates a start of a flush operation to a map data group as a target of the flush operation among the plurality of map data groups; the second operation log indicates an end of the flush operation to the map data group as the target of the flush operation; the third operation log indicates a location of a first page to store the flushed map data in the memory device; the fourth operation log indicates a location of a last page to store the flushed map data in the memory device; the fifth operation log indicates a start of an error management operation to a program error during an operation of flushing the map data into the second meta-region of the memory device; and the sixth operation log indicates a location of a last page storing normally flushed map data before an occurrence of the program error.

2. The operating method of claim 1, wherein the predetermined size is a size of a segment.

3. The operating method of claim 2, wherein the first step is performed by storing, when the controller begins the flush operation, the first operation log and the third operation log into the first meta-region of the memory device.

4. The operating method of claim 3, wherein, when there occurs the program error while the controller is flushing the map data, the second step includes:

a third step of storing the fifth operation log and the sixth operation log into the first meta-region of the memory device; and a fourth step of sequentially re-flushing the map data stored in from a page, in which the program error occurs, to a page, which is last flushed, into a page of the second meta-region next to the page, which is last flushed.

5. The operating method of claim 4, further comprising a fifth step of storing, by the controller, the second operation log and the fourth operation log into the first meta-region of the memory device after a completion of flushing one map data group.

6. The operating method of claim 1, further comprising reading, by the controller, the map data in a reverse order from a page, which is last flushed in the memory device, and loading, by the controller, the read map data to the memory when there occurs a sudden power off (SPO).

7. The operating method of claim 1, further comprising reading, by the controller, the map data in a reverse order from a page, which is flushed right before a page which is last flushed in the memory device, and loading, by the controller, the read map data to the memory when there occurs a sudden power off (SPO).

8. The operating method of claim 7, wherein the controller reads the map data according to the operation logs stored in the first meta-region.

9. A controller comprising:

a memory suitable for storing map data, wherein the controller stores a plurality of operation logs thereof in a first meta-region of a memory device, divides the map data into a plurality of map data groups each having a predetermined size, and flushes the map data divided into the plurality of map data groups, into a second meta-region of the memory device, wherein the plurality of operation logs include first to sixth operation logs, and wherein the first operation log indicates a start of a flush operation to a map data group as a target of the flush operation among the plurality of map data groups; the second operation log indicates an end of the flush operation to the map data group as the target of the flush operation; the third operation log indicates a location of a first page to store the flushed map data in the memory device; the fourth operation log indicates a location of a last page to store the flushed map data in the memory device; the fifth operation log indicates a start of an error management operation to a program error during an operation of flushing the map data into the second meta-region of the memory device; and the sixth operation log indicates a location of a last page storing normally flushed map data before an occurrence of the program error.

10. The controller of claim 9, wherein the predetermined size is a size of a segment.

11. The controller of claim 10, wherein the controller stores, when the controller begins the flush operation, the first operation log and the third operation log into the first meta-region of the memory device.

12. The controller of claim 11, wherein, when there occurs the program error while the controller is flushing the map data, the controller further:
stores the fifth operation log and the sixth operation log into the first meta-region of the memory device; and
sequentially re-flushes the map data stored in from a page, in which the program error occurs, to a page, which is last flushed, into a page of the second meta-region next to the page, which is last flushed.

13. The controller of claim 12, wherein the controller further stores the second operation log and the fourth operation log into the first meta-region of the memory device after a completion of flushing one map data group.

14. The controller of claim 9, wherein the controller further reads the map data in a reverse order from a page, which is last flushed in the memory device, and loads the read map data to the memory when there occurs a sudden power off (SPO).

15. The controller of claim 9, wherein the controller further reads the map data in a reverse order from a page, which is flushed right before a page which is last flushed in the memory device, and loads the read map data to the memory when there occurs a sudden power off (SPO).

16. The controller of claim 15, wherein the controller reads the map data according to the operation logs stored in the first meta-region.

17. A memory system comprising:
a controller including a memory suitable for storing map data; and
a memory device including meta-regions and a user data region,
wherein the controller stores a plurality of operation logs thereof in a first meta-region included in the meta-regions of the memory device, divides the map data into a plurality of map data groups each having a predetermined size, and flushes the map data divided into the plurality of map data groups, into a second meta-region included in the meta-regions of the memory device, wherein the plurality of operation logs include first to sixth operation logs, and wherein the first operation log indicates a start of a flush operation to a map data group as a target of the flush operation among the plurality of map data groups; the second operation log indicates an end of the flush operation to the map data group as the target of the flush operation;
the third operation log indicates a location of a first page to store the flushed map data in the memory device; the fourth operation log indicates a location of a last page to store the flushed map data in the memory device; the fifth operation log indicates a start of an error management operation to a program error during an operation of flushing the map data into the second meta-region of the memory device; and the sixth operation log indicates a location of a last page storing normally flushed map data before an occurrence of the program error.

18. The memory system of claim 17, wherein the controller stores, when the controller begins the flush operation, the first operation log and the third operation log into the first meta-region of the memory device.

19. The memory system of claim 18, wherein, when there occurs the program error while the controller is flushing the map data, the controller further:
stores the fifth operation log and the sixth operation log into the first meta-region of the memory device;
sequentially re-flushes the map data stored in from a page, in which the program error occurs, to a page, which is last flushed, into a page of the second meta-region next to the page, which is last flushed; and
stores the second operation log and the fourth operation log into the first meta-region of the memory device after completion of flushing one map data group divided to have a size of a segment.

20. The memory system of claim 18, wherein the controller further reads the map data in a reverse order from a page, which is last flushed in the memory device, and loads the read map data to the memory when there occurs a sudden power off (SPO).

21. A memory system comprising:
a nonvolatile memory device suitable for storing operation logs and map data;
a volatile memory suitable for temporarily storing the map data; and
a controller suitable for:
flushing the map data from the volatile memory into the nonvolatile memory device by units of map data groups; and
rebuilding the map data by selectively reading the map data by the units of map data groups from the nonvolatile memory device into the volatile memory according to the operation logs,
wherein the operation logs indicate:
locations of first and last pages to store the flushed map data;
a start of an error management operation to a program error during the flushing of the map data; and
a location of a last page storing normally flushed map data before an occurrence of the program error.

* * * * *